United States Patent
Whiting et al.

(10) Patent No.: US 7,338,398 B2
(45) Date of Patent: Mar. 4, 2008

(54) CONTINUOUSLY VARIABLE TRANSMISSION OR CLUTCH WITH ORTHO-PLANAR COMPLIANT MECHANISM

(75) Inventors: Michael J. Whiting, Roseau, MN (US); Larry L. Howell, Orem, UT (US); Robert H. Todd, Provo, UT (US); Spencer P. Magleby, Provo, UT (US); Mark C. Anderson, Lafayette, IN (US); Nathan O. Rasmussen, Provo, UT (US)

(73) Assignee: Brigham Young University, Provo, UT (US)

( * ) Notice: Subject to any disclaimer, the term of this patent is extended or adjusted under 35 U.S.C. 154(b) by 637 days.

(21) Appl. No.: 10/846,937

(22) Filed: May 14, 2004

(65) Prior Publication Data

US 2005/0014582 A1   Jan. 20, 2005

Related U.S. Application Data

(63) Continuation-in-part of application No. 10/258,568, filed as application No. PCT/US01/13351 on Apr. 25, 2001, now Pat. No. 6,983,924.

(60) Provisional application No. 60/470,602, filed on May 14, 2003, provisional application No. 60/199,905, filed on Apr. 26, 2000.

(51) Int. Cl.
*F16H 55/56*   (2006.01)
*F16H 55/36*   (2006.01)
*F16F 1/34*    (2006.01)

(52) U.S. Cl. .......................... 474/46; 367/183; 367/187; 267/161

(58) Field of Classification Search ............ 474/10–17, 474/19, 46; 367/183–187; 267/161–162; 464/29, 98
See application file for complete search history.

(56) References Cited

U.S. PATENT DOCUMENTS

| | | | |
|---|---|---|---|
| 2,407,757 A | * | 9/1946 | MacCallum ................. 464/29 |
| 2,533,249 A | * | 12/1950 | Henson, Jr. ................. 367/183 |
| 3,575,342 A | | 4/1971 | Puster |
| 3,577,184 A | | 5/1971 | McNeel et al. |
| 3,602,490 A | | 8/1971 | Mueller et al. |
| 3,742,441 A | | 6/1973 | Riley |
| 3,786,688 A | * | 1/1974 | Svenson ....................... 474/19 |

(Continued)

FOREIGN PATENT DOCUMENTS

JP   63-140152 A * 6/1988  ................... 474/14

*Primary Examiner*—Marcus Charles
(74) *Attorney, Agent, or Firm*—Thorpe North & Western LLP

(57) ABSTRACT

A continuously variable transmission or clutch device (10) includes at least one pulley (18) rotatable on a pivot (28) and having a pair of adjustable sheaves (30, 34) including a movable sheave (30) movable along the pivot. An ortho-planar compliant mechanism (14) is capable of elastic deformation and operatively coupled to the movable sheave to bias the movable sheave towards or away from the other sheave. The ortho-planar compliant mechanism includes a substantially flat configuration and is deflectable therefrom as the movable sheave moves. The ortho-planar compliant mechanism can include a center platform (38) disposed on the pivot and a plurality of arms (42) extending from the platform to distal ends (46) coupled to the movable sheave.

21 Claims, 3 Drawing Sheets

U.S. PATENT DOCUMENTS

| | | |
|---|---|---|
| 3,817,488 A | 6/1974 | Mack |
| 3,869,932 A * | 3/1975 | Fletcher ..................... 474/46 |
| 3,921,670 A | 11/1975 | Clippard, Jr. et al. |
| 3,937,242 A | 2/1976 | Eckert |
| 4,196,751 A | 4/1980 | Fischer et al. |
| 4,323,994 A | 4/1982 | Coogler |
| 4,327,257 A | 4/1982 | Schwartz |
| 4,365,963 A * | 12/1982 | Thirion de Briel ........... 474/13 |
| 4,458,344 A | 7/1984 | Coogler |
| 4,548,382 A | 10/1985 | Otting |
| 4,623,991 A | 11/1986 | Vitringa |
| 4,624,651 A * | 11/1986 | Jaccod ........................ 474/13 |
| 4,638,830 A | 1/1987 | Brown et al. |
| 4,685,094 A | 8/1987 | Vitringa et al. |
| 5,134,594 A | 7/1992 | Woo |
| 5,492,313 A | 2/1996 | Pan et al. |
| 5,555,222 A | 9/1996 | Woo |
| 5,692,982 A * | 12/1997 | Peterson ...................... 474/10 |
| 6,017,285 A * | 1/2000 | Yasuhara et al. ............. 474/12 |
| 6,248,035 B1 * | 6/2001 | Bartlett ........................ 474/13 |
| 6,585,615 B2 * | 7/2003 | Uota ........................... 474/17 |

\* cited by examiner

CONTINUOUSLY VARIABLE TRANSMISSION OR CLUTCH WITH ORTHO-PLANAR COMPLIANT MECHANISM

Priority is claimed of U.S. Provisional Patent Application No. 60/470,602, filed May 14, 2003, entitled "Continuously Variable Transmission or Clutch with Ortho-Planar Compliant Mechanism"; and this application is a continuation-in-part of U.S. patent application Ser. No. 10/258,568 U.S. Pat. No. 6,983,924, filed Jun. 30, 2003, entitled "Compliant, Ortho-Planar, Linear Motion Spring," which was the National Stage of International Application No. PCT/US01/13351, filed Apr. 25, 2001, which claims the benefit of U.S. Provisional Patent Application No. 60/199,905, filed Apr. 26, 2000.

BACKGROUND OF THE INVENTION

1. Field of the Invention

The present invention relates generally to a continuously or constant variable transmission (CVT) or clutch, and ortho-planar springs or compliant mechanisms.

2. Related Art

Some vehicles, such as snowmobiles and all-terrain vehicles (ATVs) utilize a transmission or clutch that is continuously or constantly variable. Such continuously variable transmissions (CVTs) or clutches provide an uninterrupted range of speed ratios, unlike a normal transmission that provides only a few discrete ratios. The transmission or clutch can include one or more pulleys, each with a pair of sheaves that move towards and away from one another to vary a diameter at which a belt engages the pulley. The linear movement of the sheave forms a variable diameter pulley. The linear motion of the sheave along the pivot is controlled by the speed of rotation of the pulley, torque on the transmission belt, and resistance from helical compression springs opposing the linear motion.

One disadvantage with helical compression springs is that they have only a single spring constant, making it difficult to tune for different operating conditions. Another disadvantage with helical compression springs is that they require relatively large space to accommodate the spring's minimum depth. Another disadvantage with helical compression springs is that they require a back plate to provide the spring reaction force on the pulley sheaves. Another disadvantage with helical compression springs is that some rotation or twisting occurs during their operation, thereby increasing friction, wear and noise.

SUMMARY OF THE INVENTION

It has been recognized that it would be advantageous to develop a transmission or clutch that requires less space, decreases weight, is easier and less expensive to manufacture, reduces rotation, and reduces friction, wear and noise. In addition, it has been recognized that it would be advantageous to develop a transmission or clutch that is easier to tune.

The invention provides a continuously variable transmission or clutch device with an ortho-planar compliant mechanism. The transmission or clutch includes at least one pulley, such as a drive pulley coupled to a motor, and rotatable on a pivot. The pulley receives a belt. The pulley has a pair of adjustable sheaves, including a movable sheave movable along the pivot. The movable sheave is movable between a plurality or infinite number of positions, including a farther position and a closer position. In the farther position, the pair of sheaves is farther apart from one another, and defines a smaller diameter at which the belt contacts the sheaves. In the closer position, the pair of sheaves is closer to one another, and defines a greater diameter at which the belt contacts the sheaves.

The ortho-planar compliant mechanism is capable of elastic deformation, and is operatively coupled to the movable sheave to bias the movable sheave towards or away from the other sheave. The ortho-planar compliant mechanism includes a substantially flat configuration, and is deflectable therefrom to resist movement of the movable sheave.

In accordance with a more detailed aspect of the present invention, the ortho-planar compliant mechanism includes a center platform disposed on the pivot, and a plurality of arms extending from the center platform to distal ends coupled to the movable sheave. The center platform and distal ends of the arms displace away from one another as the ortho-planar compliant mechanism deflects.

In accordance with a more detailed aspect of the present invention, the transmission or clutch can include a plurality of separate and discrete ortho-planar compliant mechanisms stacked together and deflectable together.

The invention also provides a method for tuning a continuously variable transmission or clutch, comprising the steps of: removing at least one fastener coupling at least one ortho-planar compliant mechanism to at least one sheave of a pulley rotatable around a pivot axis; adding or removing at least one ortho-planar compliant mechanism; and re-assembling the at least one fastener coupling the at least one ortho-planar compliant mechanism to the at least one sheave of the pulley.

Additional features and advantages of the invention will be apparent from the detailed description which follows, taken in conjunction with the accompanying drawings, which together illustrate, by way of example, features of the invention.

DETAILED DESCRIPTION

Figure 1:
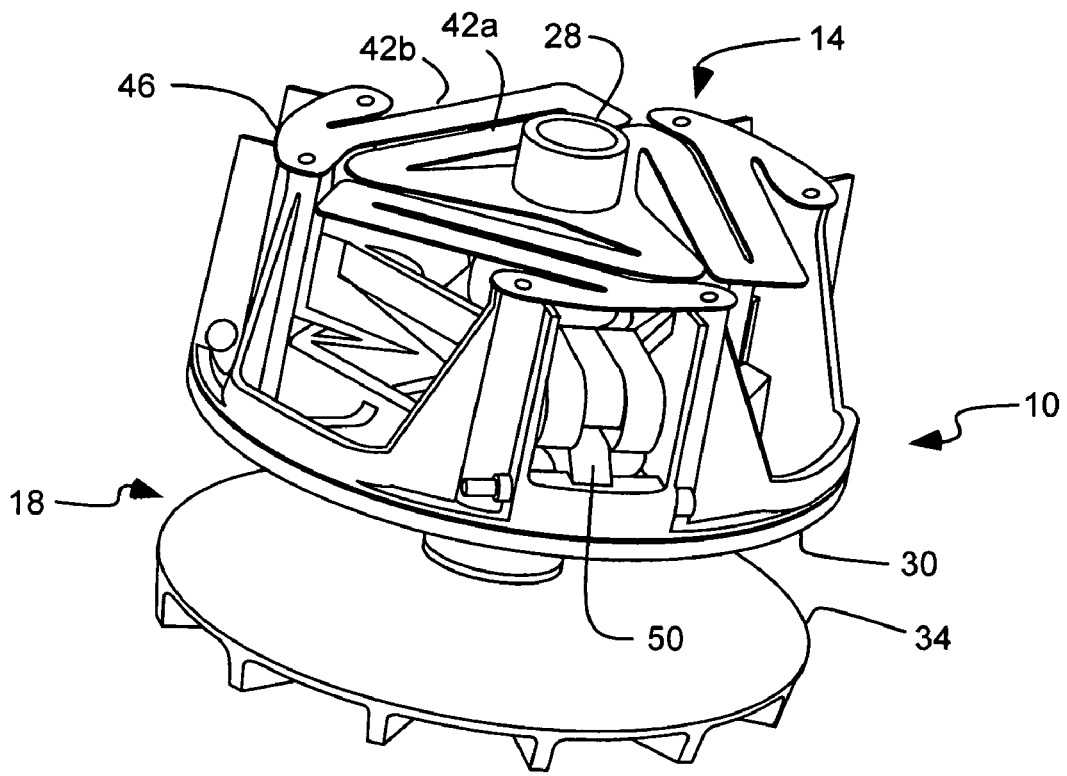
FIG. 1 is a perspective view of a transmission or clutch with an ortho-planar compliant mechanism in accordance with an embodiment of the present invention, shown at lower rpm operation.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1-7b, a continuously or constant variable transmission or clutch (or portion thereof), indicated generally at 10, is shown with a ortho-planar compliant mechanism, indicated generally at 14, in accordance with the present invention for providing power transmission between a power source, such as a gas engine or motor, and a driven member, such as an axle for a wheel or track. Such a transmission or clutch 10 can be utilized with a motorized vehicle, such as a snowmobile (as shown), an all-terrain vehicle (ATV), scooter, etc.

The transmission or clutch 10 can include a pair of pulleys, including a drive pulley 18 that is operatively coupled to the motor 20, and a driven pulley 22 that is operatively coupled to a driven member, such as an axle for a wheel or track. A belt 26 extends around and inter-couples the pair of pulleys 18 and 22. The pulleys rotate about axles or pivots 28. It will be appreciated that power from the motor is transferred to the wheels or track of the vehicle by the transmission or clutch, with the motor 20 turning the drive pulley 18, which turns the belt 26, which turns the driven pulley 22, which turns the driven member, such as the wheels or track.

Figure 2:
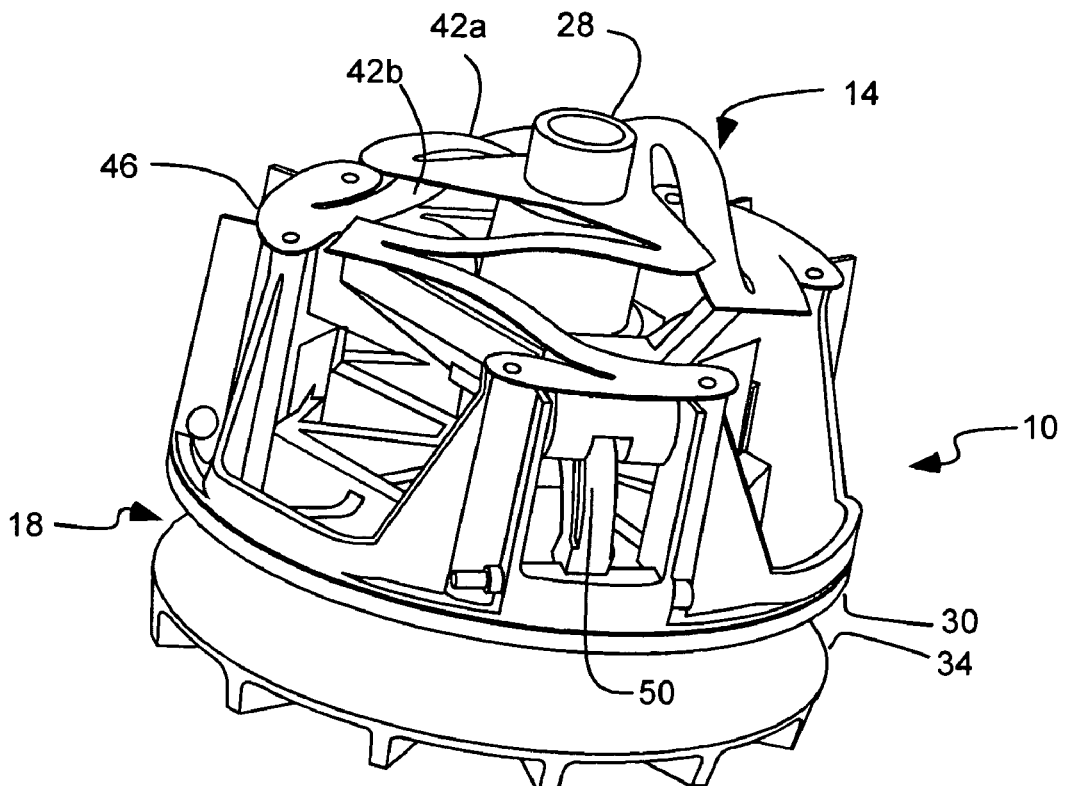
FIG. 2 is a perspective view of the transmission or clutch with the ortho-planar compliant mechanism of FIG. 1, shown at higher rpm operation.
Figure 3:
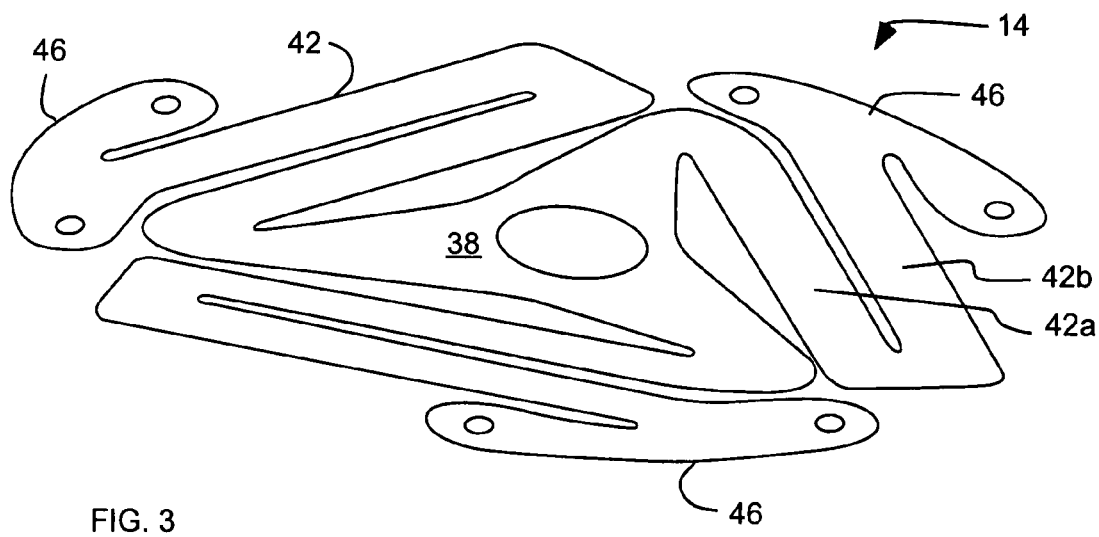
FIG. 3 is top view of the ortho-planar compliant mechanism of FIG. 1.
Figure 4:
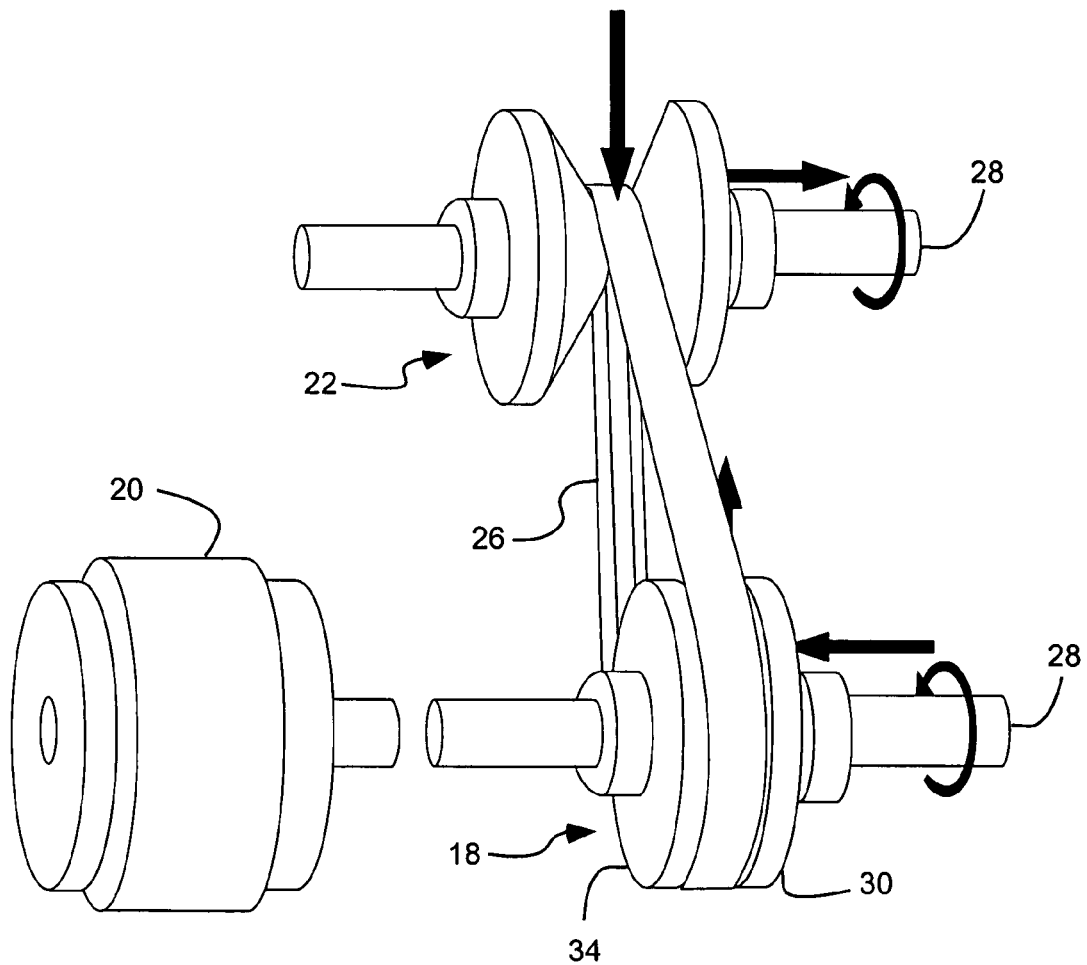
FIG. 4 is a perspective schematic view of a continuously variable transmission or clutch in accordance with the present invention.
Figure 5A:
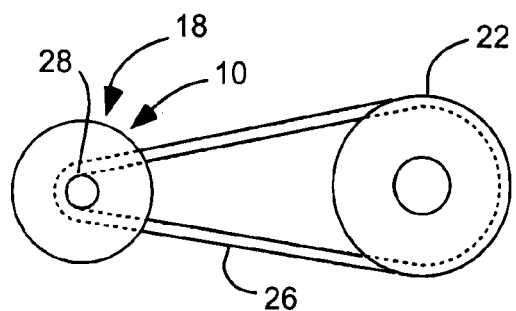
FIG. 5a is a side schematic view of a continuously variable transmission or clutch in accordance with the present invention, shown at lower rpm operation.
Figure 5B:
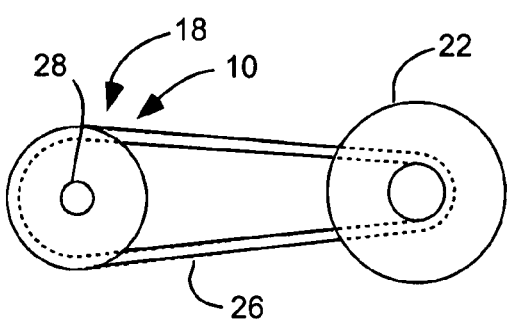
FIG. 5b is a side schematic view of the continuously variable transmission or clutch of FIG. 5a, shown at higher rpm operation.
Figure 6A:
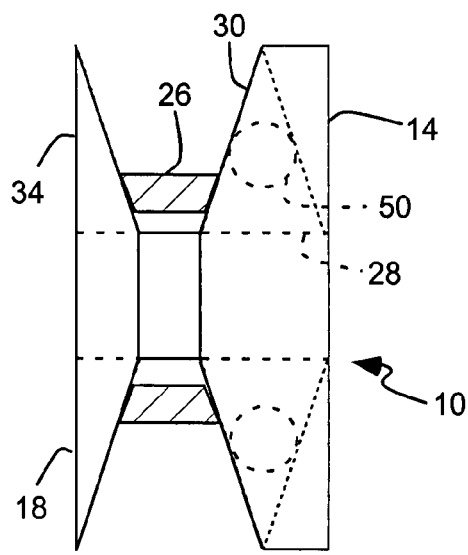
FIG. 6a is a front schematic view of the transmission or clutch with the ortho-planar spring of FIG. 1, shown at lower rpm operation.
Figure 6B:
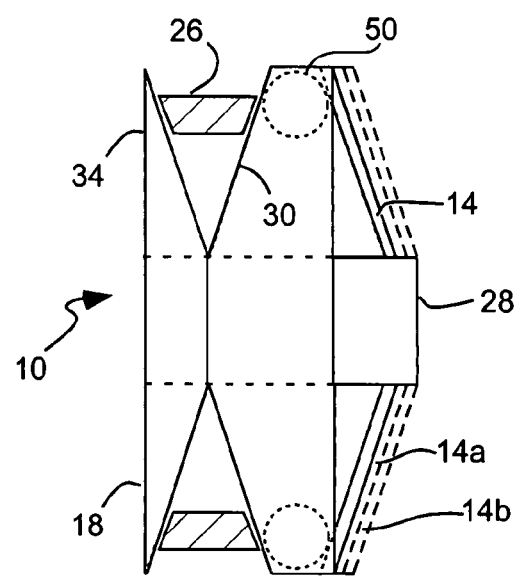
FIG. 6b is a front schematic view of the transmission or clutch with the ortho-planar spring of FIG. 1, shown at higher rpm operation.
Figure 7A:
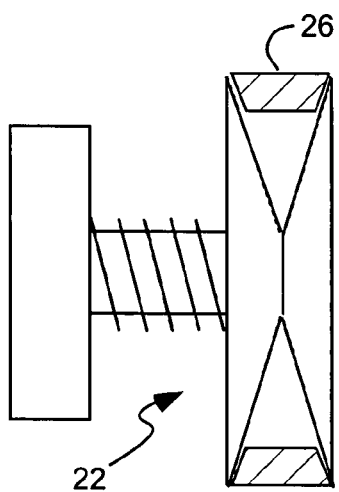
FIG. 7a is a rear schematic view of the continuously variable transmission or clutch of FIG. 5a, shown at lower rpm operation.
Figure 7B:
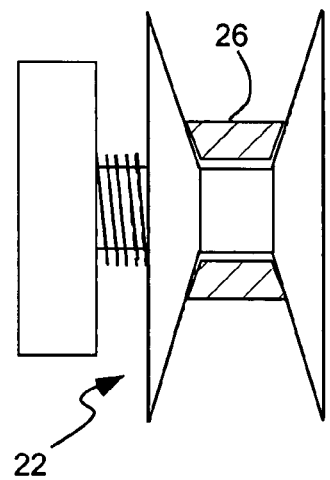
FIG. 7b is a rear schematic view of the continuously variable transmission or clutch of FIG. 5a, shown at higher rpm operation.

Each pulley, such as the drive pulley 18, can include a pair of adjustable sheaves, such as a movable sheave 30 and a stationary sheave 34. Both sheaves 30 and 34 can be coupled to and rotatable with the pivot 28. The movable sheave 30 is movable along the pivot 28 with respect to the other sheave 30. The movable sheave 30 is movable between a plurality or infinite number of positions, including a relatively closer position (as shown in FIGS. 2, 5b and 6b) and a relatively farther position (as shown in FIGS. 1, 5a and 6a). In the farther position (as shown in FIGS. 1, 5a and 6a), the pair of sheaves 30 and 34 are farther apart from one another, and define a smaller diameter at which the belt 26 contacts the sheaves. The farther position can correspond to lower rotational speeds, or lower rpms. In the closer position (as shown in FIGS. 1, 5a and 6a), the pair of sheaves 30 and 34 are closer to one another, and define a greater diameter at which the belt 26 contacts the sheaves. The closer position can correspond to higher rotational speeds, or greater rpms.

The movable sheave 30 can be biased towards the other sheave 34 by the ortho-planar compliant mechanism 14. The ortho-planar compliant mechanism can be capable of elastic deformation to exert a force on the movable sheave 30. The ortho-planar compliant mechanism can be coupled to and can extend between the pivot 26 and the movable sheave 30.

The ortho-planar compliant mechanism can provide a force to control engagement speed, shifting performance, and return force after slow down.

The ortho-planar compliant mechanism is a single plane compliant mechanism that has motion or deflection out of that plane, without substantial rotation throughout its deflection. The ortho-planar compliant mechanism operates by displacing a central platform relative to a base or distal end along at least a portion of an axial direction perpendicular to both the platform and base. A resilient and flexible connecting structure is connected to and between the base and platform. The connecting structure is bendable to develop an axial force along the axial direction to bias the platform in a stable position with respect to the base. It also bends to develop non-axial forces which substantially sum to zero to preserve the orientation of the platform with respect to the base. The ortho-planar compliant mechanism is very compact, and can be made out a variety of materials, including stainless steel, spring steel, polypropylene, and polycrystalline silicon. The ortho-planar compliant mechanism does not rotate when deflected, is compact in that it is relatively thin and substantially flat, and does not require a back plate for retention or resistive force.

The ortho-planar compliant mechanism 14 can have a substantially flat configuration, as shown in FIG. 1, and thus occupies less space than a normal compression spring. In addition, the ortho-planar compliant mechanism can weigh less than a typical compression spring. Weight and space reduction are issues for various vehicles. For example, weight savings is important in snowmobiling for handling and other reasons, and space savings can be important in ATVs and scooters to increase performance and reduce drag and inertia. As the movable sheave 30 moves, the ortho-planar compliant mechanism deflects out of the flat configuration, as shown in FIG. 2.

The ortho-planar compliant mechanism 14 can be substantially unstressed in the substantially flat configuration (FIG. 1). It will be appreciated that vehicles can spend a substantial amount of time at rest. Thus, keeping the ortho-planar compliant mechanism 14 unstressed in the flat configuration can resist permanent deformation. When the ortho-planar compliant mechanism is deflected out of the flat configuration, it provides a resistance force to the movable sheave.

The ortho-planar compliant mechanism 14 can include a center platform 38 or portion coupled to and/or keyed to the pivot 28. The center platform can include an aperture to receive the pivot therethrough. The platform 38 can abut to a shoulder or flange on the pivot to prevent the platform from sliding further on the pivot. A plurality of arms 42 can extend from the center platform 38 to distal ends 46. The distal ends 46 of the arms 42 can be attached to the movable sheave 30. The distal ends 46 can include opposite protrusions with apertures to receive fasteners, such as bolts, to secure the distal ends to the movable sheave. Thus, a center portion of the ortho-planar compliant mechanism can be disposed on the pivot while a perimeter portion can be secured to the movable sheave. As the movable sheave moves, the center platform 38 and distal ends 46 of the arms 42 displace away from one another, and the arms 42 deflect or elastically deform. The compliant mechanism can have any number of arms, including three (as shown). Three arms provide stability and decreases the degrees of freedom to one.

Each arm 42 of the ortho-planar compliant mechanism 14 can include a pair of parallel segments 42a and 42b coupled together in series, and oriented parallel to one another. Thus, the arm 42 doubles-back on itself. A first segment 42a can extend from the center platform 38, while a second segment 42b can extend from the first segment 42a to the distal end 46. As the ortho-planar compliant mechanism 14 deflects, the arms 42 allow the distal ends 46 and the center platform 38 to displace with respect to one another without the ortho-planar compliant mechanism twisting or rotating, thus reducing wear, friction and noise. The arms can have any number of segments, including two (as shown). In addition, the segments can have substantially the same length (as shown), or can have different lengths. The distal ends 46 can be separated from one another, as shown, or can be interconnected to form a base.

In addition, the arms 42 can each be oriented transverse to a radial direction. Thus, the length of the arms can be longer while still fitting between the center and the perimeter. Alternatively, the arms 42 can be oriented radially, or extending radially outward.

As described above, the ortho-planar compliant mechanism 14 can be flat and thin. A plurality of separate and discrete ortho-planar compliant mechanisms 14, 14a, 14b can be stacked together and can be deflectable together to increase the resistance. The stack of multiple ortho-planar compliant mechanisms can allow the transmission or clutch to be tuned, as described in greater detail below.

As described above, the drive pulley 18 can be operatively coupled to the motor 20 and can form at least a portion of a drive pulley assembly. The drive pulley assembly can also include roller weights 50 or rocker arms pivotally or movably coupled with respect to the movable sheave 30. As the drive pulley 18 increases rotational speed, the roller weights or rocker arms move or pivot to push the movable sheave 30 towards the other sheave 34, overcoming the biasing force exerted by the ortho-planar compliant mechanism 14. As the movable sheave 30 moves towards the other sheave 34, the diameter at which the belt 26 contacts the sheaves increases.

The driven pulley 22 also can include a pair of sheaves that operate similarly to those described above, but can move in an opposite direction. Thus, as the driven pulley 22 increases rotational speed, the driven pulley sheaves separate and reduce the diameter at which the belt contacts the sheaves. The driven pulley can form at least part of a driven pulley assembly that can include a clutch. A spring can bias the sheaves together. Alternatively, another ortho-planar compliant mechanism can be used to bias the sheaves together. Thus, an ortho-planar compliant mechanism can bias a movable sheave towards or away from the other sheave.

As stated above, a stack of ortho-planar compliant mechanisms 14, 14a, 14b can be used to tune the transmission or clutch. One or more ortho-planar compliant mechanisms can be removed from, or added to, the stack to decrease or increase the resistance force applied by the stack. The fasteners coupling the ortho-planar compliant mechanisms to the sheave can be removed. The spring constant of the stack of ortho-planar compliant mechanisms can be varied by adding or removing one or more ortho-planar compliant mechanisms, thus simplifying tuning. One or more of the ortho-planar compliant mechanisms can be removed from the stack. Alternatively, one or more ortho-planar springs can be added to the stack. The fasteners can be reassembled.

In addition, one or more ortho-planar compliant mechanisms can be substituted for a typical helical compression spring and back plate on an existing clutch mechanism by removing the coil spring and attaching the ortho-planar compliant mechanism.

The ortho-planar compliant mechanisms can be substantially thin and flat, and can be manufactured using any number of fabrication methods, including stamping, blanking, fine blanking, laser cutting, water jet cutting, wire EDM, milling and injection molding. Thus, the manufacturing cost can be reduced because the compliant mechanisms are identical, and can be made at high volume. It can be constructed out of many kinds of materials, including stainless steel, spring steel, etc.

Various aspects of ortho-planar compliant mechanism are described in U.S. patent application Ser. No. 10/258,568, which is herein incorporated by reference. The central platform 38 and base or distal ends 46 are coupled to the base by a resilient and flexible connecting structure, such as the arms 42. The platform and distal ends move linearly with respect to one another along the pivot 28, which is perpendicular to both the platform 38 and the distal ends 46 without substantially twisting with respect to one another about the pivot. Thus, the platform 38 and distal ends 46 remain substantially parallel. The connecting structure or arms 42 are bendable to develop axial and non-axial forces. The axial forces are directed along the pivot 26 to bias the platform 38 in a stable position with respect to the base or distal ends 46. The non-axial forces substantially sum to zero, or cancel each other, to preserve the linear motion, and the parallel orientation of the platform and distal ends.

The distal ends 46 have a surface and the platform 38 has a surface that remain substantially parallel with respect to one another during movement. The direction of displacement is perpendicular to both the surfaces. The platform and distal ends are movable between a coplanar relationship and a non-coplanar relationship. Thus, the ortho-planar compliant mechanism can be completely flat.

The distal ends 46, central platform 38, and connecting structure or arms 42 can be integrally formed from a single sheet of planar or flat material. The material, and thus the connecting structure, can be compliant to allow the connecting structure to bend, and to allow the connection of the connecting structure to the distal ends and platform to bend. The connecting structure can include a plurality of arms, or sets of segments or members, which may extend at any angle from the platform or distal ends. The connecting structure also may include an intermediate platform coupled between the segments or members 42a and 42b. As stated above, the arms 42 can be offset or transverse to the radial direction, or can be oriented to extend radially with respect to the center platform. The connecting structure or arms 42 bend to develop axial forces in the axial or pivot direction, and non-axial forces. Thus, as the center platform 38 moves with respect to the base or distal ends 46 along the axial or pivot direction, the connecting structure or arms bend. The attachment point between the segments, or the intermediate platform, moves laterally or transverse to the axial or pivot direction. The axial forces act to force the central platform 38 towards or away from the base or distal ends 46 along a linear movement path or pivot, and bias the platform in a stable position with respect to the base or distal ends. The non-axial forces tend to force the platform along a movement path out of the linear movement path. The sum of the non-axial forces is substantially zero, thus maintaining the orientation of the platform.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A continuously variable transmission or clutch device, comprising:
   a) at least one pulley rotatable on a pivot and having a pair of adjustable sheaves including a movable sheave movable along the pivot; and
   b) an ortho-planar compliant mechanism further comprising:
      1) a base operatively coupled to the movable sheave;
      2) a center platform, movably coupled to the base, and movable linearly along at least a portion of an axial direction without substantial pivoting about the axial direction with respect to the base; and
      3) a resilient and flexible connecting structure, connected to and between the base and center platform, and bendable to develop (i) an axial force along the axial direction to bias the platform in a stable position with respect to the base, and (ii) non-axial forces which substantially sum to zero to preserve the orientation of the platform with respect to the base; and
   c) wherein the ortho-planar compliant mechanism can bias the movable sheave towards or away from the other sheave.

2. A device in accordance with claim 1, wherein the ortho-planar compliant mechanism is substantially unstressed in a substantially flat configuration, and provides a resistance force when deflected from the substantially flat configuration.

3. A device in accordance with claim 1, wherein the center platform is disposed on the pivot, and wherein the flexible connecting structure further comprises a plurality of arms extending from the center platform having distal ends coupled to the movable sheave and further wherein the center platform and movable sheave displace away from one another as the ortho-planar compliant mechanism deflects.

4. A device in accordance with claim 3, wherein each arm includes a pair of parallel segments coupled together in series and oriented parallel to one another.

5. A device in accordance with claim 3, wherein each arm is oriented transverse to a radial direction with respect to the pivot.

6. A device in accordance with claim 3, wherein the central platform and movable sheave remain substantially parallel during deflection.

7. A device in accordance with claim 3, wherein the central platform and movable sheave are co-planar in the substantially flat configuration.

8. A device in accordance with claim 1, further comprising:
   a plurality of separate and discrete ortho-planar compliant mechanisms stacked together and deflectable together.

9. A device in accordance with claim 1, wherein the pulley forms at least part of a drive pulley assembly operatively coupled to the motor, and further comprising roller weights pivotally coupled with respect to the movable sheave, the roller weights pivoting to push the movable sheave towards the other sheave as the drive pulley increases rotational speed; and wherein the ortho-planar compliant mechanism exerts a force to bias the movable sheave away from the other sheave.

10. A continuously variable transmission or clutch device, comprising:
    a) a pair of pulleys, at least one of the pulleys being operatively coupled to a motor;
    b) a belt, extending around and inter-coupling the pair of pulleys; and
    c) at least one of the pulleys being rotatable on a pivot and including a pair of adjustable sheaves including a movable sheave movable along the pivot with respect to the other sheave, the movable sheave being movable between:
       i) a closer position in which the pair of sheaves is closer to one another and defines a greater diameter at which the belt contacts the sheaves, and
       ii) a farther position in which the pair of sheaves is farther apart from one another and defines a smaller diameter at which the belt contacts the sheaves; and
    d) an ortho-planar compliant mechanism, coupled to the movable sheave, to bias the movable sheave towards or away from the other sheave;
    the ortho-planar compliant mechanism comprising:
       i) a center platform disposed on the pivot;
       ii) a plurality of arms extending from the center platform to distal ends coupled to the movable sheave, and
       iii) wherein each arm includes a pair of parallel segments coupled together in series and oriented parallel to one another.

11. A device in accordance with claim 10, wherein the ortho-planar compliant mechanism has a substantially flat configuration in which the ortho-planar compliant mechanism is substantially unstressed, and providing a resistance force when deflected from the substantially flat configuration.

12. A device in accordance with claim 10, wherein each arm is oriented transverse to a radial direction with respect to the pivot.

13. A device in accordance with claim 10, further comprising:
    a plurality of separate and discrete ortho-planar compliant mechanisms stacked together and deflectable together.

14. A device in accordance with claim 10, wherein one of the pair of pulleys forms at least part of a drive pulley assembly operatively coupled to the motor, and further comprising roller weights pivotally coupled with respect to the movable sheave, the roller weights pivoting to push the movable sheave to the closer position as the drive pulley increases rotational speed; and wherein the ortho-planar compliant mechanism exerts a force to bias the movable sheave away from the other sheave.

15. A continuously variable transmission or clutch device, comprising:
    a) a pair of pulleys, including a drive pulley being operatively coupled to a motor;
    b) a belt, extending around and inter-coupling the pair of pulleys; and
    c) the drive pulley being rotatable on a pivot and including a pair of adjustable sheaves including a movable sheave movable along the pivot with respect to the other sheave, the movable sheave being movable between:
       i) a closer position in which the pair of sheaves is closer to one another and defines a greater diameter at which the belt contacts the sheaves, and
       ii) a farther position in which the pair of sheaves is farther apart from one another and defines a smaller diameter at which the belt contacts the sheaves; and
    d) a stack of ortho-planar compliant mechanisms, coupled between the pivot and the movable sheave, to bias the movable sheave away from the other sheave; and e) wherein the stack of ortho-planar compliant mechanisms are bendable to develop non-axial forces which substantially sum to zero to preserve the orientation of the movable sleeve with respect to the pivot.

16. A device in accordance with claim 15, wherein each of the ortho-planar compliant mechanisms is substantially unstressed in a substantially flat configuration, and provides a resistance force when deflected from the substantially flat configuration.

17. A device in accordance with claim 15, wherein each of the ortho-planar compliant mechanisms includes:
   a center platform disposed on the pivot;
   a plurality of arms extending from the center platform having distal ends coupled to the movable sheave;
   the center platform and distal ends of the arms displacing away from one another as the ortho-planar compliant mechanisms deflect.

18. A device in accordance with claim 17, wherein each arm includes a pair of parallel segments coupled together in series and oriented parallel to one another.

19. A device in accordance with claim 17, wherein each arm is oriented transverse to a radial direction with respect to the pivot.

20. A method for tuning a continuously variable transmission or clutch, comprising the steps of:
   a) removing at least one fastener coupling at least one ortho-planar compliant mechanism to at least one sheave of a pulley rotatable around a pivot axis;
   b) adding or removing at least one ortho-planar compliant mechanism having a plurality of arms, wherein each arm includes a pair of parallel segments coupled together in series and oriented parallel to one another; and
   c) re-assembling the at least one fastener coupling the at least one ortho-planar compliant mechanism to the at least one sheave of the pulley.

21. A method in accordance with claim 20, wherein the step of adding or removing at least one ortho-planar compliant mechanism further includes i) adding at least one ortho-planar compliant mechanism to a stack of ortho-planar compliant mechanisms, or ii) removing at least one ortho-planar compliant mechanisms from a stack of ortho-planar compliant mechanisms.

* * * * *